United States Patent [19]

Oinoue et al.

[11] 4,443,079
[45] Apr. 17, 1984

[54] METHOD AND APPARATUS FOR DETECTING FOCUS CONDITION OF OBJECTIVE LENS

[75] Inventors: Kenichi Oinoue, Tokyo; Asao Hayashi; Masatoshi Ida, both of Hachioji; Masahiro Aoki, Fussa; Junichi Nakamura, Hachioji; Kenji Fukuoka, Fussa, all of Japan

[73] Assignee: Olympus Optical Co. Ltd., Tokyo, Japan

[21] Appl. No.: 426,898

[22] Filed: Sep. 29, 1982

[30] Foreign Application Priority Data

Oct. 6, 1981 [JP] Japan .................................. 56-159218

[51] Int. Cl.³ .............................................. G03B 3/00
[52] U.S. Cl. ...................................................... 354/407
[58] Field of Search .................................... 354/25, 31

[56] References Cited

U.S. PATENT DOCUMENTS 4,185,191  1/1980  Stauffer ............................. 354/25 X
4,387,975  6/1983  Araki .................................. 354/25

Primary Examiner—Michael L. Gellner
Attorney, Agent, or Firm—Parkhurst & Oliff

[57] ABSTRACT

A focus condition of an objective lens is detected on the basis of a lateral shift of two images formed by first and second light fluxes which are transmitted through right- and left-hand halves of the lens, respectively. In order to separate the first and second light fluxes, there is arranged an array of triangle prisms each having first and second surfaces which are inclined symmetrically with respect to the optical axis of lens by a critical angle so that one of the light fluxes is transmitted through the one of the surfaces, but is totally reflected by the other surface of each prism. The first and second light fluxes transmitted through the prisms are received by an array of light receiving elements in such a manner that the first and second light fluxes are selectively received by odd and even numbered light receiving elements, respectively.

12 Claims, 7 Drawing Figures

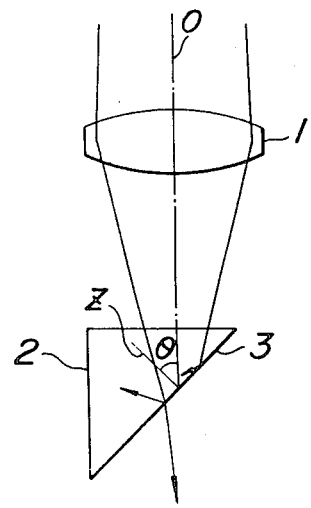
FIG_1
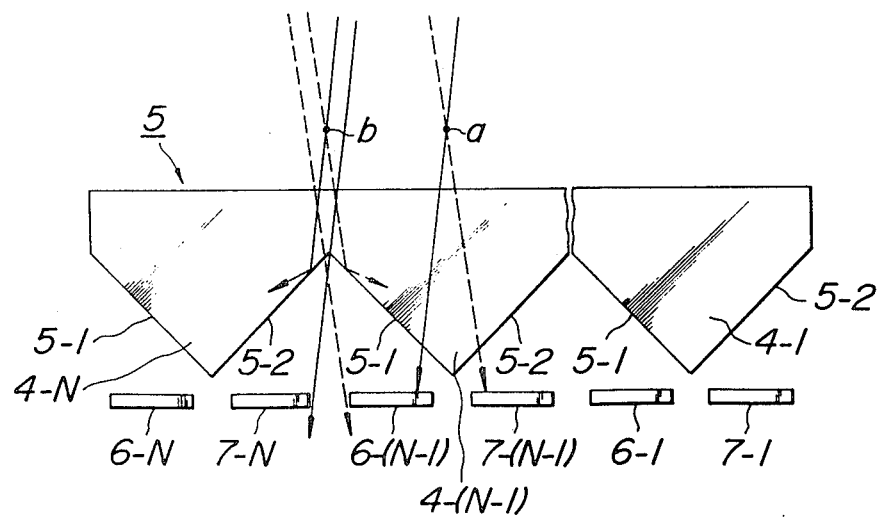
FIG_2

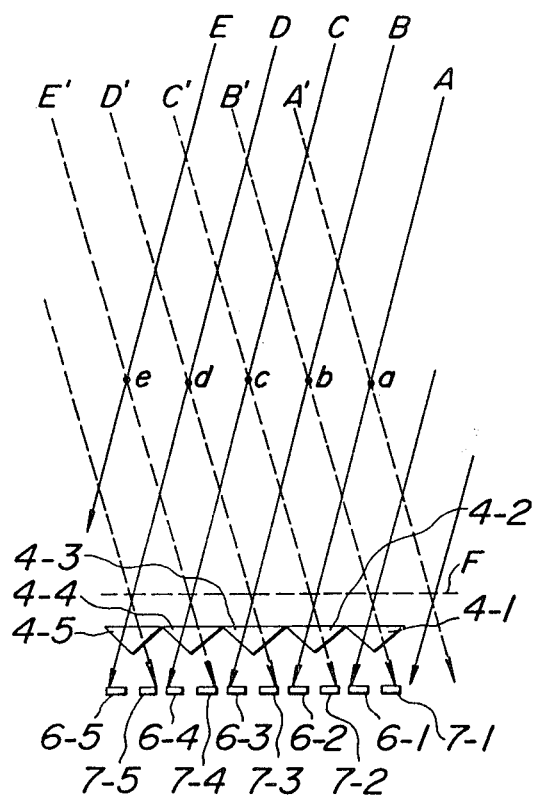
FIG_3C

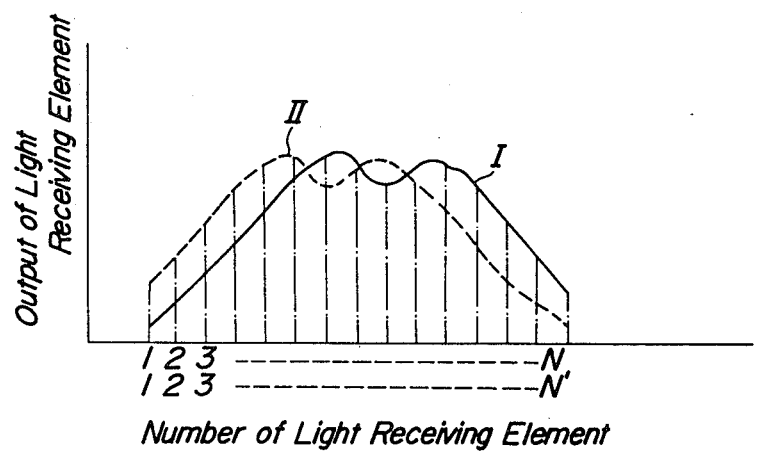

METHOD AND APPARATUS FOR DETECTING FOCUS CONDITION OF OBJECTIVE LENS

BACKGROUND OF THE INVENTION

The present invention relates to a method and an apparatus for detecting a focus condition of an objective lens for use in a still camera, a cinecamera, an optical apparatus for taking microphotographs, etc.

Until now various types of the focus detection methods and apparatuses have been proposed. For example, in a Japanese Patent Laid-open Publication No. 60,645/73, the apparatus has been proposed wherein light fluxes transmitted through symmetric portions of an objective lens with respect to its optical axis are received by light receiving elements respectively through a vibrating lattice and a focus condition of the lens is detected on the basis of a difference between photoelectrically converted outputs derived from these light receiving elements. However, in such focus detection apparatus, the lattice must be supported movably and must be vibrated by a driving system, a whole apparatus becomes large in size and complex in construction.

In order to eliminate such drawbacks, another known detection apparatus has been further proposed in a Japanese Paten Laid-open Publication No. 142,512/77, wherein an image to be inspected is divided into two images by means of two wedge-shaped prisms arranged symmetrically and the two images are projected onto two series of photo receiving elements through a relay lens and a focusing condition is detected on the basis of a lateral shift of the divided images by suitably processing output difference between these series of light receiving elements. In the focus detection apparatus mentioned above, the system construction can be made relatively simple because it is not necessary to provide the lattice vibrating system and the movably supporting mechanism. However, since the images divided by the wedge-shaped prisms are projected onto the two series of light receiving elements by means of the relay lens, it is not possible to satisfy sufficiently a requirement for a compact system and is extremely difficult to adjust an optical positional relation between the relay lens, the series of the light receiving elements, etc. Moreover, since use is made of the two series of light receiving elements which are arranged side by side, it is not possible to perform the focus detection in a highly accurate manner due to differences of their characteristics.

SUMMARY OF THE INVENTION

The present invention has for its object to eliminate the drawbacks mentioned above and to provide a focus detection method which can perform a focus detection in a highly accurate manner.

According to the invention, in a method of detecting a focusing condition of an objective lens for forming an image of an object on a predetermined focal plane by selectively introducing first and second light fluxes each emanating from at least a part of respective one of first and second halves of objective lens divided along a plane including the optical axis of objective lens, onto first and second light receiving means, respectively, and by processing photoelectrically converted outputs supplied from the first and second light receiving means, the improvement comprises introducing the first and second light fluxes into first and second light splitting means arranged between the objective lens and the first and second light receiving means, respectively, said first and second light splitting means including first and second optical surfaces, respectively, each of which is formed by an interface between higher refractive index material and lower refractive index material viewed in a light propagating direction and said first and second optical surfaces being inclined symmetrically with respect to the optical axis by such angles that the first light flux is transmitted through the first optical surface, but is totally reflected by the second optical surface and that the second light flux is transmitted through the second optical surface, but is totally reflected by the first optical surface.

Another object of the invention is to provide a focus detection apparatus for carrying out the above mentioned focus detection method by means of a compact optical system.

According to the invention, an apparatus for detecting a focus condition of an objective lens for forming an image of an object on a predetermined focal plane comprises light splitting means comprising first and second optical surfaces each of which is formed by an interface between higher and lower refractive index materials, said first and second optical surfaces being inclined symmetrically with respect to an optical axis by an angle substantially equal to a critical angle;

means comprising first and second light receiving elements arranged to receive first and second light fluxes emanating from first and second halves of the objective lens and transmitted through said first and second optical surfaces, respectively; and means for processing photoelectrically converted outputs from said first and second light receiving elements to detect the focus condition of the objective lens on the basis of a lateral shift of two images formed by said two light fluxes transmitted through the first and second optical surfaces.

BRIEF DESCRIPTION OF THE DRAWINGS

FIG. 1 is a schematic view showing a theory of separating a light flux on the basis of a critical angle according to the invention;

FIG. 2 is a schematic view illustrating one embodiment of the focus detection apparatus according to the invention;

FIGS. 3A to 3C are schematic views showing a relation between a focal position and a light flux deviation in in-focused, forwardly-defocused, and backwardly-defocused conditions respectively;

FIG. 4 is a graph showing output signal distributions of first and second series of light receiving elements.

DESCRIPTION OF THE PREFERRED EMBODIMENTS

Figure 3A:
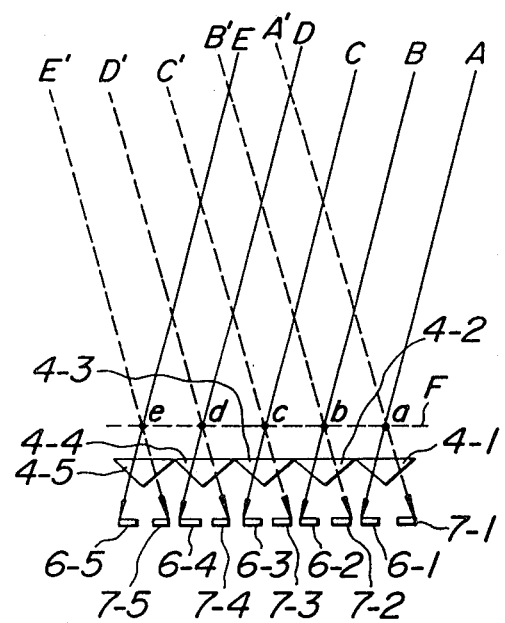

FIG. 1 is a schematic view explaining a theory of separating a light flux emanating from one half of an objective lens from a light flux emanating from the other half of the objective lens, said halves being divided along a plane including the optical axis of objective lens. In FIG. 1, in an image side space of an objective lens such as a photographic lens 1 there is arranged a triangle prism 2. An inclined surface 3 of the prism 2 is so set that an angle $\theta$ between an optical axis O and a normal Z with respect to the inclined surface 3 is near a critical angle. For example, if it is assumed that the prism 2 is made of material having a refractive index n of 1.5 and is surrounded by an air, the angle $\theta(=\sin^{-1} 1/n)$ is set at about 42°. In this manner, light rays transmitted through a right-hand half portion of the lens 1 with respect to a plane perpendicular to the drawing and including the optical axis O are made incident upon the inclined surface 3 at angles greater than the critical angle, and thus a light beam consisting of these light rays is totally reflected by the inclined surface 3. On the contrary, light rays transmitted through a left-hand half portion of the lens 1 is made incident upon the inclined surface 3 at angles less than the critical angle, and thus a light beam consisting of these light rays is refracted by the inclined surface 3. In case of rotating the prism 2 about the optical axis O by 180°, the light beams transmitted through the right portion and the left portion of the lens 1 are refracted and reflected, respectively by the inclined surface 3. In this manner, by making use of the critical angle, it is possible to separate stably the light fluxes transmitted through the right and left portions of the lens 1 with respect to the plane perpendicular to the drawing and including the optical axis O.

In a preferred embodiment of the invention using the critical angle mentioned above, the light fluxes transmitted through the right portion (first region) and the left portion (second region) of the lens 1 are separated respectively by means of an array of prisms each having inclined surfaces which are so constructed that these light fluxes are made incident upon the inclined surfaces at the angles larger or smaller than the critical angle, and then at least a part of the light flux separated by the prism is received by a pair of light receiving elements.

FIG. 2 is a schematic view showing one embodiment of a construction of prisms and an arrangement of a pair of light receiving elements of the focus detection apparatus according to the invention. In the present embodiment, prisms 4-1, . . . , 4-(N-1), and 4-N are formed in one body and each prism has two inclined surfaces 5-1 and 5-2 upon which the light fluxes transmitted through the first and second regions are made incident. That is to say, the light flux transmitted through the first region (light rays shown by solid lines) is made incident upon the surface 5-1 at a smaller angle than the critical angle, but is made incident upon the surface 5-2 at an angle larger than the critical angle. This relation is entirely reversed for the light flux transmitted through the second region (light rays shown by dotted lines). In such a construction, as clearly seen from the light flux impinging upon a focal point a or b, the light fluxes transmitted through the first and second regions of the lens 1 are reflected by the inclined surfaces 5-2 and 5-1 respectively, so that only the light flux from the first region is transmitted through the inclined surface 5-1 and also only the light flux from the second region is transmitted through the inclined surface 5-2. Therefore, if a plurality of light receiving elements 6-1, 7-1; . . . ; 6-(N-1), 7-(N-1); 6-N, 7-N are arranged in an array in such a manner that the elements 6-1, 7-1; . . . 6-N, 7-N are symmetrical with respect to ridgelines of respective prisms 4-1, . . . , 4-(N-1), 4-N, only the light flux transmitted through the first region of the lens is made incident upon the light receiving elements 6-1~6-N (first series of light receiving elements) and also only the light flux transmitted through the second region is made incident upon the light receiving elements 7-1~7-N (second series of light receiving elements).

Figure 3B:
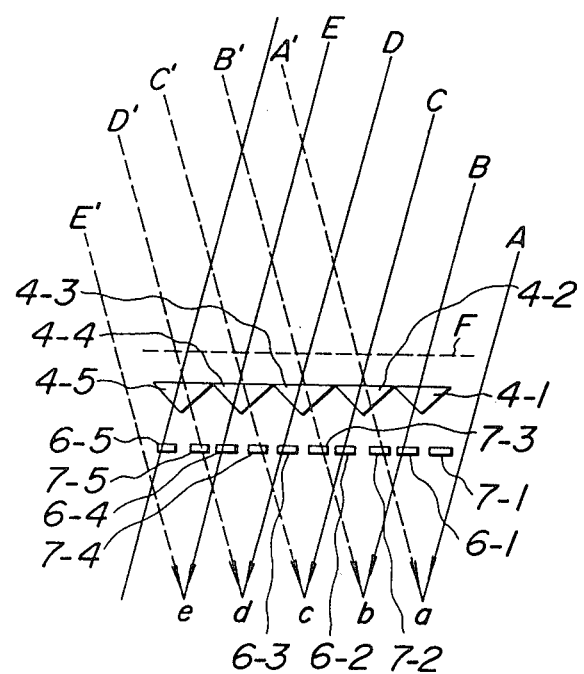

FIGS. 3A to 3C are schematic views showing a relation between a focal position and a light flux deviation. In FIGS. 3A to 3C, for the sake of simplicity, five prisms 4-1~4-5 and five light receiving element pairs 6-1~6-5; 7-1~7-5 are shown and the light fluxes transmitted through the first region of the lens are denoted by A~E, the light rays transmitted through the second region of the lens by A'~E', and focal points are denoted by a~e. In the present embodiment, the prisms 4-1~4-5 are arranged near a predetermined focal surface F which is conjugated with a focal plane on which an image of an object is to be formed. As shown in FIG. 3A, in case that the focal points a~e are located just on the focal surface F i.e. in an in-focused condition, the light rays A and A', B and B', . . . , E and E' are made incident upon the light receiving elements 6-1 and 7-1, 6-2 and 7-2, . . . , 6-5 and 7-5, respectively. In this case, since distributions of an incident light intensity upon the first series of light receiving elements 6-1~6-5 and the second series of light receiving elements 7-1~7-5 become the same, output distributions thereof are identical with each other. That is to say, the elements 6-1 and 7-1 receive the same light rays. Contrary to this, as shown in FIG. 3B, in case that the focal points a~e are situated backward the series of the light receiving elements i.e. in a forwardly-defocused condition, for example, the light rays B and B' are made incident upon the light receiving elements 6-1 and 7-3 respectively, the other light fluxes are made incident upon the light receiving elements each shifted from the in-focused condition. Therefore, in this case, distributions of the incident light intensity upon the first and second series of light receiving elements are different from each other and output distributions become also different as illustrated by curves I and II in FIG. 4. Moreover, as shown in FIG. 3C, in case that the focal points a~e are situated forward the focal surface F i.e. in a backwardly-defocused condition, the light fluxes A~E and A'~E' are shifted inversely in opposite directions as compared with the case shown in FIG. 3B, and thus output distributions of the first and second series of light receiving elements are shifted inversely as compared with the curves shown in FIG. 4.

Therefore, direction and amount of the defocused condition can be detected by detecting direction and amount of the relative shift of the two divided images impinging upon the light receiving elements. One preferred embodiment of the focus condition detecting method will be explained hereinbelow. At first, output differences between all the adjacent light receiving elements are measured to detect positions M and M' for the first and second series of the light receiving elements showing the maximum output differences of the same polarity. Then, the M and M' having the same polarity are compared with each other. Then the focusing condition is detected as follows; M>M' . . . backwardly-defocused condition, M<M' . . . forwardly-defocused condition, and M=M' . . . in-focused condition. In addition, by calculating M-M', a deviation amount from the in-focused condition can be obtained. It should be noted that if more than two maximum output differences having the same value are detected, the smallest numbers of positions may be chosen as the values M and M'.

Figure 5:
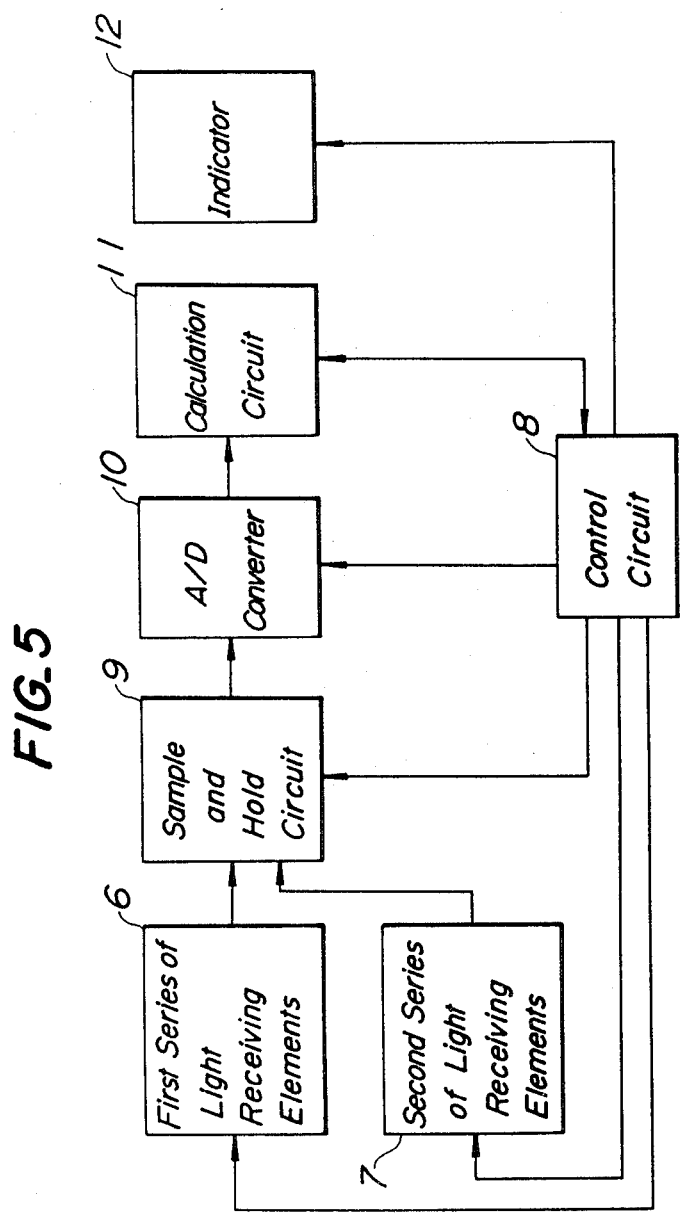
FIG. 5 is a block diagram illustrating an embodiment of a calculation unit of the focus detection apparatus according to the invention.

FIG. 5 is a block diagram showing one embodiment of a calculation unit of the focus detection apparatus according to the invention. In the embodiment shown in FIG. 5, the first series of light receiving elements 6 comprising the light receiving elements 6-1~6-N and the second series of light receiving elements 7 comprising the light receiving elements 7-1~7-N are driven under the control of a control circuit 8. Then, photoelectrically converted output signals thereof are held by a sample and hold circuit 9 and then are successively converted into digital signals by means of an A/D converter 10. The digital signal are then supplied to a calculation circuit 11. In the calculation circuit 11, differences between successive light receiving elements of respective series are calculated so as to detect the positions M and M' of the light receiving elements producing the outputs which show the maximum difference and the same polarity, and then obtained M and M' are supplied to the control circuit 8 after comparing each other. The control circuit 8 functions to detect the focusing condition such as forwardly-defocused, backwardly-defocused, and in-focused conditions corresponding to the signal supplied from the calculation circuit 11, and to indicate the detected amount of deviation from the in-focused position on an indicator 12. In addition, in the defocused condition, the deviation amount from the in-focused condition is also represented on the indicator 12. Therefore, the focusing control can be effected manually or automatically corresponding to the information indicated on the indicator 12.

The present invention is not limited to the embodiments mentioned above, but various modifications and alternations are possible. For example, in the above embodiment the light fluxes transmitted through the first and second regions of the objective lens are separated by the triangular prism, but other polygonal prisms or a cone-shaped optical member can be used for such separation. In this case, such light dividing members may be arranged at the same position as the embodiment mentioned above. That is to say, each pair of the light receiving elements may be arranged symmetrically with respect to an apex or a ridgeline. Moreover, a parallel plate made of glass or plastics may be arranged on the bottom surface of the prism. In such a case, it is possible to receive only the desired light flux effectively by means of light receiving elements having a narrower width.

Further, the inclined surface of the prism is not always necessary to be formed by an interface between the prism and air, but may be formed by an interface between higher and lower refractive index materials.

According to the invention, since it is not necessary to provide the moving mechanism, the relay lens, etc., the whole apparatus can be made simple in construction and small in size. Moreover, since the light receiving elements for the first and second series can be formed integrally in an array, characteristic variation between the first and second series of the light receiving elements can be eliminated and thus the focus detection can be performed in a highly accurate manner.

What is claimed is:

1. In a method of detecting a focusing condition of an objective lens for forming an image of an object on a predetermined focal plane by selectively introducing first and second light fluxes each emanating from at least a part of respective one of first and second halves of objective lens divided along a plane including the optical axis of objective lens, onto first and second light receiving means, respectively, and by processing photoelectrically converted outputs supplied from the first and second light receiving means, the improvement comprising introducing the first and second light fluxes into first and second light splitting means arranged between the objective lens and the first and second light receiving means, respectively, said first and second light splitting means including first and second optical surfaces, respectively, each of which is formed by an interface between higher refractive index material and lower refractive index material viewed in a light propagating direction and said first and second optical surfaces being inclined symmetrically with respect to the optical axis by such angles that the first light flux is transmitted through the first optical surface, but is totally reflected by the second optical surface and that the second light flux is transmitted through the second optical surface, but is totally reflected by the first optical surface.

2. A method according to claim 1, wherein said first and second light fluxes are introduced into an array of light receiving elements which are alternately belonging to said first and second light receiving means, by means of a prism member which includes an array of optical surfaces which are alternately belonging to said first and second light splitting means.

3. A method according to claim 2, wherein differences of outputs of successive elements of the first and second light receiving means are respectively derived to detect positions M and M' of the elements which produces the maximum differences of the same polarity, respectively, and the focus condition of the objective lens is detected in accordance with a difference M−M' of the detected positions.

4. A method according to claim 3, wherein a direction of a defocused condition is detected by a sign of said difference M−M'.

5. A method according to claim 3, wherein an amount of a defocused condition is detected by an amount of said difference M−M'.

6. An apparatus for detecting a focus condition of an objective lens for forming an image of an object on a predetermined focal plane comprising light splitting means comprising first and second optical surfaces each of which is formed by an interface between higher and lower refractive index materials, said first and second optical surfaces being inclined symmetrically with respect to an optical axis by an angle substantially equal to a critical angle;

means comprising first and second light receiving elements arranged to receive first and second light fluxes emanating from first and second halves of the objective lens and transmitted through said first and second optical surfaces, respectively; and means for processing photoelectrically converted outputs from said first and second light receiving elements to detect the focus condition of the objective lens on the basis of difference between said two light fluxes transmitted through the first and second optical surfaces.

7. An apparatus according to claim 6, wherein said first and second optical surfaces are formed by a prism.

8. An apparatus according to claim 7, wherein a plurality of prisms each having the first and second optical surfaces are arranged in an array and a plurality of pairs of the first and second light receiving elements are aligned in a corresponding array in such a manner that the first and second light receiving elements are arranged alternately.

9. An apparatus according to claim 8, wherein said plurality of prisms are integrally formed in one body.

10. An apparatus according to claim 8, wherein said first and second light receiving elements are integrally formed in one body.

11. An apparatus according to claim 8, wherein said prisms are formed by triangle prisms.

12. An apparatus according to claim 8, wherein said processing means comprises a circuit for detecting the focus condition of the objective lens in accordance with a lateral shift of two images formed by the first and second light fluxes transmitted through the prisms.

* * * * *

UNITED STATES PATENT AND TRADEMARK OFFICE
CERTIFICATE OF CORRECTION

PATENT NO. : 4,443,079
DATED : April 17, 1984
INVENTOR(S) : OINOUE et al

It is certified that error appears in the above-identified patent and that said Letters Patent are hereby corrected as shown below:

Column 3, line 4, delete "an".

Column 4, line 25, after "backward" insert -- of --.

Column 4, line 37, after "forward" insert -- of --.

Signed and Sealed this

Fifth Day of February 1985

[SEAL]

Attest:

DONALD J. QUIGG

Attesting Officer     Acting Commissioner of Patents and Trademarks